(12) United States Patent
Loeffler et al.

(10) Patent No.: US 6,530,292 B1
(45) Date of Patent: Mar. 11, 2003

(54) METHOD FOR DETERMINING A SHIFTING STEP FOR A DISCRETELY SHIFTING TRANSMISSION OF A MOTOR VEHICLE

(75) Inventors: Juergen Loeffler, Winnenden (DE); Martin-Peter Bolz, Oberstenfeld (DE); Holger Huelser, Stuttgart (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/914,187

(22) PCT Filed: Nov. 20, 2000

(86) PCT No.: PCT/DE00/04245

§ 371 (c)(1),
(2), (4) Date: Aug. 24, 2001

(87) PCT Pub. No.: WO01/48398

PCT Pub. Date: Jul. 5, 2001

(30) Foreign Application Priority Data

Dec. 24, 1999 (DE) .......................... 199 62 962

(51) Int. Cl.[7] .................. F16H 59/00; F16H 61/00; F16H 63/00
(52) U.S. Cl. .............. 74/336 R; 477/115; 701/54; 701/64
(58) Field of Search .............. 74/336 R; 477/97, 477/115; 701/53, 54, 56, 64

(56) References Cited

U.S. PATENT DOCUMENTS

| | | | |
|---|---|---|---|
| 4,226,295 A | 10/1980 | Grob et al. ................. 180/335 |
| 4,680,959 A * | 7/1987 | Henry et al. .................. 73/117 |
| 4,698,763 A | 10/1987 | Smyth ...................... 364/424.1 |
| 4,964,318 A | 10/1990 | Ganoung ...................... 74/859 |
| 5,172,609 A | 12/1992 | Nitz et al. .................... 74/866 |
| 5,484,350 A | 1/1996 | Ishikawa et al. .............. 477/97 |
| 6,104,974 A * | 8/2000 | Zhang et al. ................. 701/51 |
| 6,154,701 A * | 11/2000 | Loffler et al. ................ 701/54 |
| 6,416,440 B1 * | 7/2002 | Jeon ........................... 477/123 |
| 6,418,365 B1 * | 7/2002 | Loffler et al. ................ 701/51 |

FOREIGN PATENT DOCUMENTS

DE 196 25 936 1/1998

* cited by examiner

Primary Examiner—Sherry Estremsky
Assistant Examiner—Tisha D. Lewis
(74) Attorney, Agent, or Firm—Walter Ottesen

(57) ABSTRACT

A method for determining a shift stage (transmission ratio) for a discretely shifting transmission of a motor vehicle wherein an output rpm of the transmission is detected and an optimal motor rpm is pregiven.

It is provided that computed and/or measured input rpms (22, 23) of the transmission are detected. An rpm (25, 26) for each shift stage is fixed via a hysteresis circuit (24), a difference of the input rpm (22) of a next-higher shift stage and the rpm (26) supplies an upshift limit (10) and a sum of current input rpm (23) and the rpm (25) supplies a downshift limit (12); and, shifting into a higher shift stage takes place when the upshift limit (10) exceeds the optimal motor rpm (28) or shifting into a lower shift stage takes place when the optimal motor rpm (28) exceeds the downshift limit (12) (shifting necessity (27)).

8 Claims, 3 Drawing Sheets

METHOD FOR DETERMINING A SHIFTING STEP FOR A DISCRETELY SHIFTING TRANSMISSION OF A MOTOR VEHICLE

FIELD OF THE INVENTION

The invention relates to a method for determining a shift stage for a discretely shifting transmission of a motor vehicle.

BACKGROUND OF THE INVENTION

From the state of the art, solutions are known wherein a transmission ratio of the motor vehicle transmission is used to adjust an optimal engine rpm. However, all these solutions require a continuously variable automatic transmission. However, the previous methods cannot be easily transferred to a discretely shifting transmission.

In discretely shifting transmissions, such as stepped automatic or automated shift transmissions, so-called pendular shifting can occur in specific operating situations wherein changes occur between the individual gears in rapid sequence. Such pendular shifting can lead to disturbances in the driving performance of the vehicle and must therefore be suppressed when possible. It is known from DE 196 25 936 to assign transmission ratio ranges to individual shift stages and in these transmission ratio ranges, shifting is suppressed. The application of the transmission ratio ranges corresponding to individual shift stages is, however, very complex. All transmission ratio ranges have to be pregiven in advance and this is especially complex when additional parameters such as a driving situation or a driver characteristic should be included.

SUMMARY OF THE INVENTION

With the method of the invention, it is possible to significantly simplify the determination of the shift stage for an optimal engine rpm without the occurrence of pendular shifting. The application of the shift stage selection has been significantly simplified in that:

a) computed and/or measured input rpms of the transmission are detected for the shift stages;
b) an rpm is fixed for each shift stage via a hysteresis circuit;
c) a difference of the input rpm of a next-higher shift stage and the rpm supplies an upshift limit and a sum of the actual input rpm and the rpm supplies a downshift limit; and,
d) a shift into a higher shift stage results when exceeding the upshift limit beyond the optimal engine rpm or a shift into a lower shift stage takes place (shift necessity) when exceeding the optimal engine rpm beyond the down-shift limit.

Furthermore, it has been shown to be advantageous to fix the hysteresis circuit based on a characteristic field in which parameters such as driver characteristic and/or an instantaneous driving situation can be included. A driver characteristic is understood to be, for example, a driving behavior which can be inputted by the driver and is with respect to consumption or power. The instantaneous driving situation can be considered especially via influences on the hysteresis circuit during city driving, stop and go traffic or for a driving operation under increased load.

In a preferred configuration of the invention, an upper limit for the input rpm is pregiven for each shift stage. When exceeding the upper limit, a shifting into a higher shift stage is forced to take place. In the same way, a lower limit rpm is pregiven for each shift stage wherein a shift into a lower shift stage takes place when there is a drop below the lower limit. With these upper and lower limits (shift stage limiters), maximum and minimum rpms for the particular shift stage can be pregiven wherein a long term stable operation is possible. The upper and lower limits are applied independently of the hysteresis circuit.

If the necessity of an upshift either by exceeding the upper limit or by exceeding the upshift limit beyond the optimal engine rpm is given, then preferably a shift into the next-following higher shift stage takes place wherein the upshift limit, which is determined for this upshift stage, has not yet exceeded the optimal engine rpm. The same can be done with the presence of a necessity for downshifting. In this case, the shift into the next-following lower shift stage takes place when the downshift limit, which was determined for this shift stage, has not yet dropped below the optimal engine rpm. In this way, the upshift or downshift can be forced continuously via sequential shift stages; however, in extreme cases, a shift over several shift stages can be made possible.

The input rpms can, in a preferred manner, be computed based on the output rpm and the given transmission ratios of the shift stages so that an additional rpm sensor at the transmission input shaft is unnecessary.

BRIEF DESCRIPTION OF THE DRAWINGS

The invention will now be described with respect to the drawings wherein.

DESCRIPTION OF THE PREFERRED EMBODIMENTS OF THE INVENTION

Figure 1:
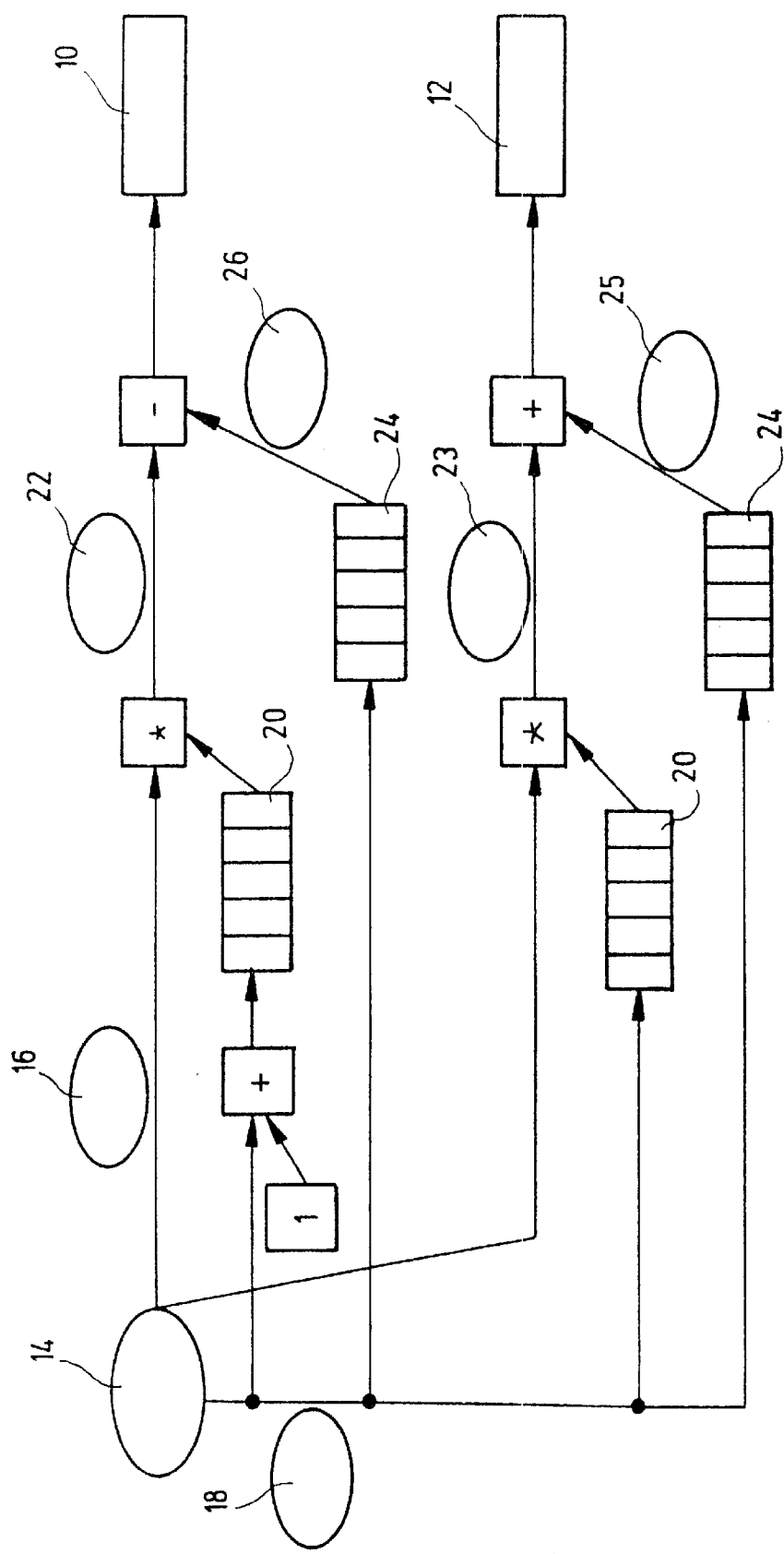
FIG. 1 is a block circuit diagram for determining an upshift limit and a downshift limit.

In FIG. 1, a block circuit diagram is shown which is intended to make clear the determination of an upshift limit 10 or a downshift limit 12 for individual shift stages of a discretely shifting transmission 14 of a motor vehicle. Depending upon the configuration of the transmission 14, for example, as a stepped automatic or automated shift transmission, a different number of shift stages 1, 2, ..., n is present having strictly uniform transmission ratios. Each shift stage can accordingly be assigned a transmission ratio. At the motor end, the transmission has a suitable drive element to which a force is applied by a vehicle engine. In correspondence to a motor rpm, an input rpm results for the drive element which can, in principle, be directly detected but can be significantly more reliably computed in the manner described hereinafter.

First, an output rpm 16 of the transmission 14 is detected (for example, via a mounted rpm sensor). Furthermore, a current shift stage 18 is given. As already explained, the individual shift stages are numbered in correspondence to a descending transmission ratio. The input rpms 22, 23 for each possible shift stage can be computed with the aid of the output rpm 16 and the transmission ratios of the individual shift stages stored in a characteristic field 20. Accordingly, the upper part of FIG. 1 shows the determination of the input rpm 22 for a next-higher shift stage than the just current shift stage 18. The input rpm 23 of the lower portion of FIG. 1 corresponds to the current input rpm. In this sense, input rpms can be determined for all available shift stages. For reducing the application complexity, it has been advantageously shown to determine only input rpms for the current shift stage and neighboring shift stages. Of course, the current input rpm 23 can be directly detected also via a suitable rpm sensor.

An rpm (25, 26) is determined by a hysteresis circuit 24 at least in dependence upon the particular shift stage. The upshift limit 10 results from subtracting the rpm 26 from the input rpm 22; whereas, the sum of the rpm 25 and the current input rpm 23 leads to the downshift limit 12.

Figure 2:
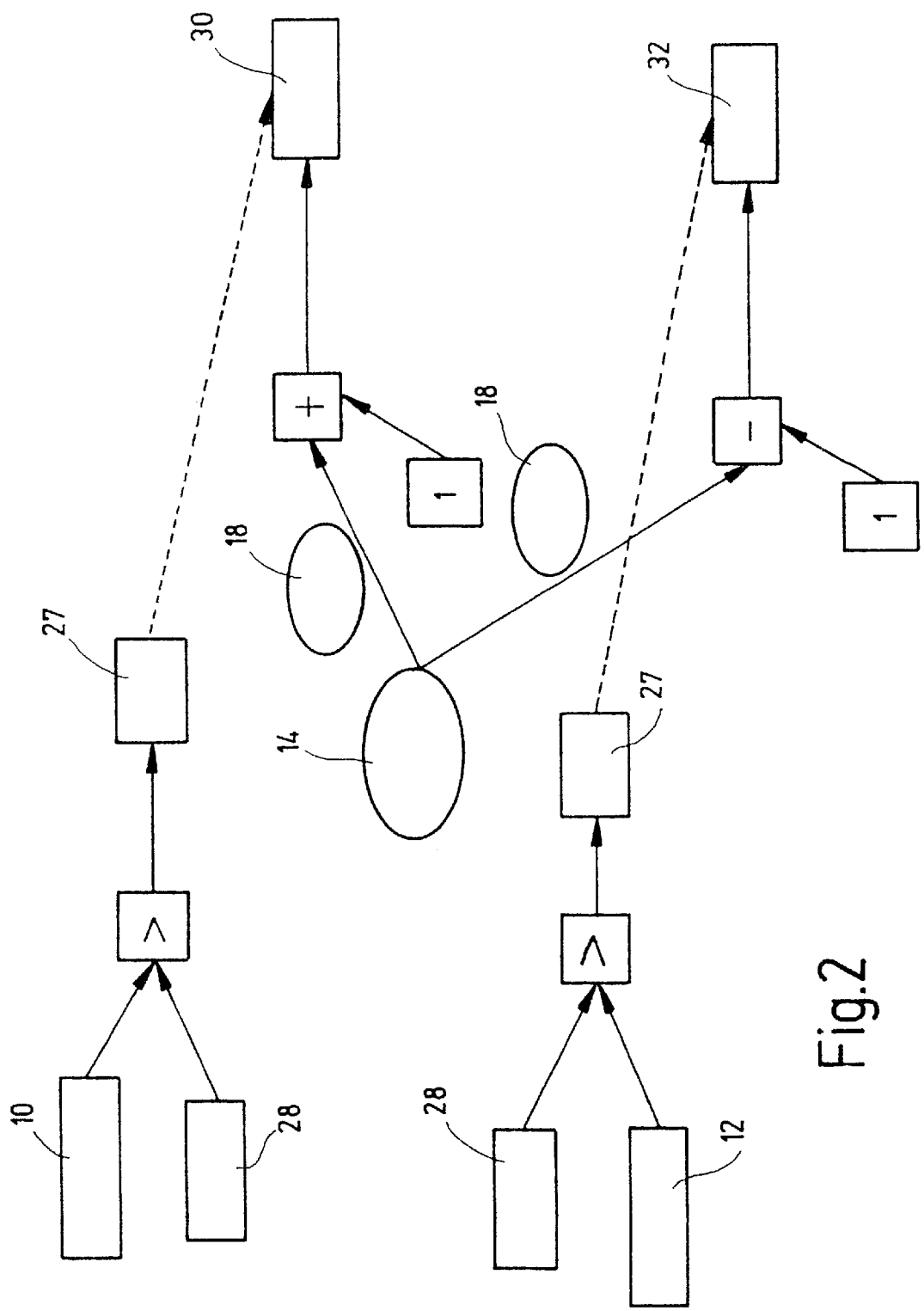
FIG. 2 is a block circuit diagram for determining a shifting necessity.

To determine a shift necessity 27, the upshift limit 10 and the downshift limit 12 are compared to an optimal rpm 28 of the motor. If the upshift limit 10 is greater than the optimal rpm 28 or if the downshift limit 12 is less than the optimal rpm, then a shift necessity 27 is present (see FIG. 2).

If the optimal rpm 28 is exceeded by the upshift limit 10, then a shift into a higher shift stage is forced and, in accordance with the embodiment, into the next-higher shift stage 30. If the necessity to downshift is present, then a lower shift stage is set, which here is the next-lower shift stage 32. In principle, it is conceivable to also jump over several shift stages at once in lieu of such a continuous upshifting or downshifting. However, it has been shown to be advantageous to permit this type of shifting only when the determined upshift limit of the next-following higher shift stage is likewise exceeded or when the determined downshift limit of the next-following lower shift stage drops below the optimal motor rpm 28.

As already explained, the fixing of the rpm (25, 26) takes place while considering the particular shift stage via the hysteresis circuit 24. It is further conceivable to permit other parameters to be included in the hysteresis circuit 24. A driver characteristic 34, a driving situation 36 or an operating situation 38 are mentioned as exemplary parameters. The driver characteristic 34 includes quantities which especially consider a consumption optimized or power optimized driving performance of the vehicle driver. If the vehicle driver, for example, places value on minimizing fuel consumption, then, in general, the rpms (25, 26) are reduced in order to make possible an adjustment of the optimal rpm 28 as rapidly as possible.

Figure 3:
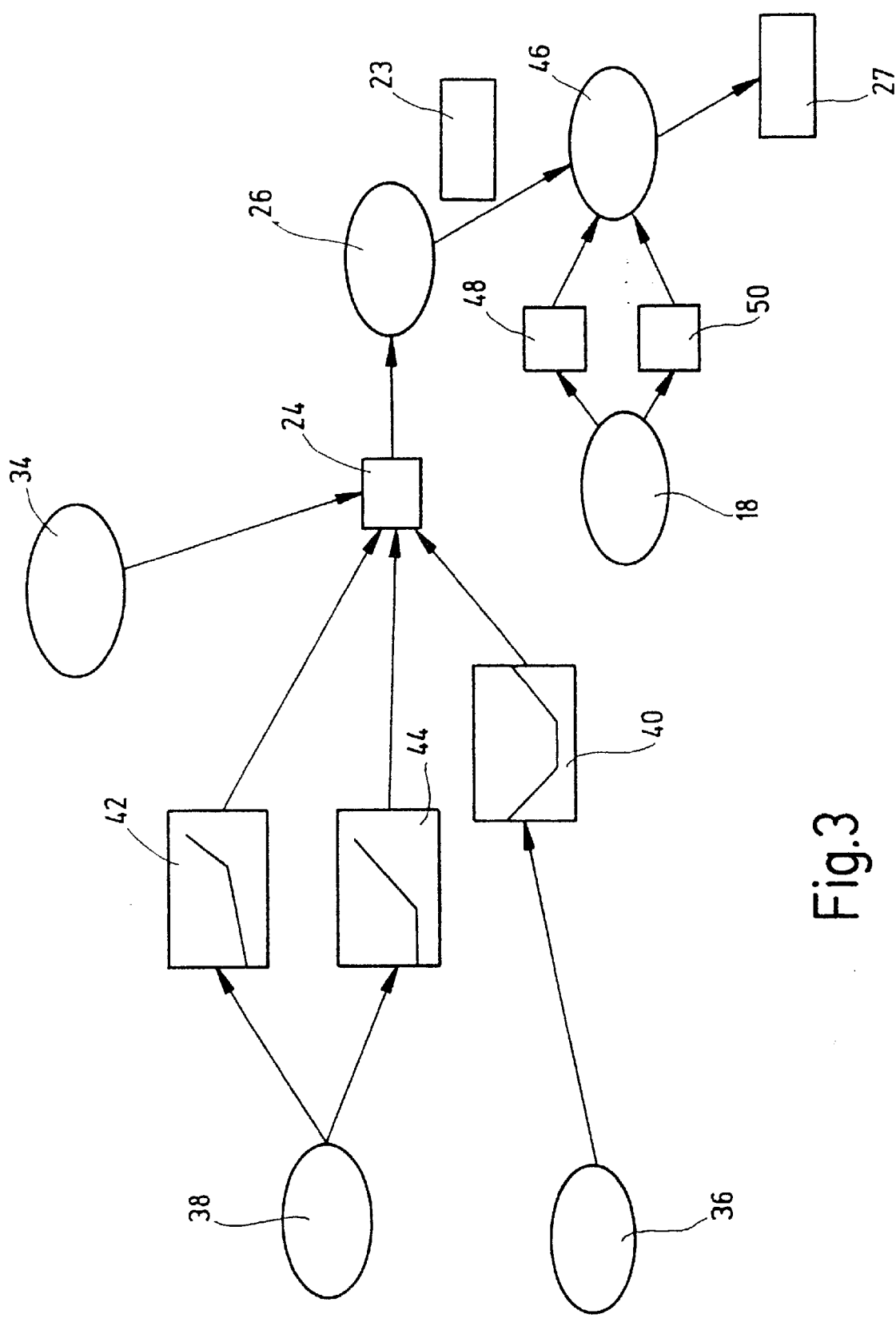
FIG. 3 is a block circuit diagram for determining the rpm and an upper limit and a lower limit for each shift stage (shift stage limiter).

For specific driving situations 36, it can be advantageous to include additional parameters in the characteristic field. Accordingly, FIG. 3 shows a characteristic line 40 which can be included in the characteristic field for considering a driving operation under increased load (for example, uphill travel).

In the same way, specific operating situations 38 can be satisfied if, for example, the characteristic lines 42, 44 for a city driving operation and stop and go traffic operation are taken up into the hysteresis circuit 24 to determine the rpms 25, 26.

Additionally, maintaining pregiven rpm limits can be ensured via a shift stage limiter 46 so that shifting is forced even when the upshift limit 10 or the downshift limit 12 has not yet been exceeded or dropped below, respectively. For the particular current shift stage 18, an upper limit 48 and a lower limit 50 accordingly exist. If the current input rpm 23 exceeds the upper limit 48, then an upshift takes place even if the upshift limit 10, which was fixed via the rpm 25, is not yet exceeded. Likewise, a downshift is forced when the current input rpm 23 drops below the lower limit 50 (in both cases, shift necessity 27 is then present). Here too, the shifting can take place continuously to next-following shift stages in the manner already described.

What is claimed is:

1. A method for determining a shift stage (transmission ratio) for a discretely shifting transmission of a motor vehicle wherein an output rpm of the transmission is detected and an optimal motor rpm is pregiven, the method comprising the steps of:

detecting at least one of the computed and measured input rpms of the transmission for the shift stages;

fixing an rpm for each shift stage utilizing a hysteresis circuit;

providing an upshift limit from a difference of the input rpm of a next-higher shift stage and the rpm fixed by said hysteresis circuit and providing a downshift limit from a sum of the current input rpm and the rpm fixed by said hysteresis circuit; and, when the upshift limit exceeds an optimal motor rpm, shifting into a higher shift stage or, when the downshift limit is less than the optimal motor rpm, shifting into a lower shift stage (shift necessity).

2. The method of claim 1, wherein the hysteresis circuit is fixed based on a characteristic field including parameters: driver characteristic and/or an instantaneous driving situation and/or an operating situation.

3. The method of claim 1, wherein an upper limit for the input rpm is pregiven for each shift stage and a shifting into a higher shift stage takes place when the upper limit is exceeded.

4. The method of claim 1, wherein a lower limit for the input rpm is pregiven for each shift stage and a shifting into a lower shift stage takes place when dropping below the lower limit.

5. The method of claim 1, wherein shifting into a next-following higher shift stage takes place in which the upshift limit, which is determined for this shift stage, has not yet exceeded the optimal motor rpm.

6. The method of claim 1, wherein the shifting into a next-following lower shift stage takes place in which the downshift limit, which is determined for this shift stage, does not yet drop below the optimal motor rpm.

7. The method of claim 1, wherein the input rpms of the transmission are computed with the aid of the output rpm and the given transmission ratios of the shift stages.

8. The method of claim 2, wherein, to determine the parameters, it is determined whether:

the driver has inputted a consumption-optimized driving performance or a power-optimized driving performance (driver characteristic); and/or a city driving operation (operating situation) is present; and/or, a stop and go driving operation (driving situation) is present; and/or, a driving operation under increased load (driving situation) is present.

* * * * *